United States Patent
Vartanian et al.

(10) Patent No.: US 8,743,244 B2
(45) Date of Patent: Jun. 3, 2014

(54) PROVIDING AUGMENTED REALITY BASED ON THIRD PARTY INFORMATION

(75) Inventors: Harry Vartanian, Philadelphia, PA (US); Jaron Jurikson-Rhodes, Philadelphia, PA (US)

(73) Assignee: HJ Laboratories, LLC, Philadelphia, PA (US)

( * ) Notice: Subject to any disclaimer, the term of this patent is extended or adjusted under 35 U.S.C. 154(b) by 0 days.

(21) Appl. No.: 13/052,359

(22) Filed: Mar. 21, 2011

(65) Prior Publication Data

US 2012/0242865 A1    Sep. 27, 2012

(51) Int. Cl.
*H04N 5/262* (2006.01)
*H04N 5/222* (2006.01)
*G03B 21/26* (2006.01)

(52) U.S. Cl.
USPC .................. 348/239; 348/333.02; 353/28

(58) Field of Classification Search
USPC .......................................................... 353/28
See application file for complete search history.

(56) References Cited

U.S. PATENT DOCUMENTS

| | | | |
|---|---|---|---|
| 5,956,180 A | 9/1999 | Bass et al. |
| 6,014,188 A | 1/2000 | Yamada et al. |
| 6,037,882 A | 3/2000 | Levy |
| 6,144,358 A | 11/2000 | Narayanaswamy et al. |
| 6,172,798 B1 | 1/2001 | Albert et al. |
| 6,204,896 B1 | 3/2001 | Matsuhira et al. |
| 6,633,310 B1 | 10/2003 | Andrew et al. |
| 6,697,083 B1 | 2/2004 | Yoon |
| 6,816,437 B1 | 11/2004 | Teller et al. |
| 6,870,532 B2 | 3/2005 | Travers et al. |
| 6,895,259 B1 | 5/2005 | Blank nee Keller et al. |
| 7,027,311 B2 | 4/2006 | Vanderelli et al. |
| 7,050,835 B2 | 5/2006 | Hack et al. |
| 7,138,985 B2 | 11/2006 | Nakajima |
| 7,190,416 B2 | 3/2007 | Paukshto et al. |
| 7,225,414 B1 | 5/2007 | Sharma et al. |
| 7,319,992 B2 | 1/2008 | Gaos |
| 7,352,356 B2 | 4/2008 | Roberts et al. |
| 7,368,307 B2 | 5/2008 | Cok |
| 7,508,411 B2 | 3/2009 | Boesen |
| 7,585,220 B2 | 9/2009 | Loose et al. |
| 7,688,315 B1 | 3/2010 | Gettemy et al. |
| 7,724,441 B2 | 5/2010 | Amitai |
| 7,738,678 B2 | 6/2010 | Breed et al. |
| 7,751,122 B2 | 7/2010 | Amitai |

(Continued)

FOREIGN PATENT DOCUMENTS

| | | | |
|---|---|---|---|
| EP | 0676781 B1 | 1/1999 |
| EP | 1887313 A1 | 2/2008 |

(Continued)

OTHER PUBLICATIONS

Sony Ericsson Xperia Pureness Manual, Released in 2009.

(Continued)

*Primary Examiner* — Albert Cutler
(74) *Attorney, Agent, or Firm* — Volpe and Koenig, P.C.

(57) ABSTRACT

An apparatus and method for providing augmented or mixed reality environments based on other user or third party information, such as from a profile, is disclosed. Also, an apparatus and method for providing a transparent display device with adaptive transparency is disclosed. The transparent display device with adaptive transparency may be used to generate the augmented reality environment.

6 Claims, 4 Drawing Sheets

(56) References Cited

U.S. PATENT DOCUMENTS

| | | | |
|---|---|---|---|
| 7,756,297 B2 | 7/2010 | Pryor | |
| 7,760,187 B2 | 7/2010 | Kennedy | |
| 7,787,028 B2 * | 8/2010 | Kojo | 348/239 |
| 7,808,450 B2 | 10/2010 | Wanda et al. | |
| 7,841,944 B2 | 11/2010 | Wells | |
| 7,843,449 B2 | 11/2010 | Krah | |
| 8,025,398 B2 | 9/2011 | Jannard | |
| 8,098,170 B1 | 1/2012 | Szczerba et al. | |
| 2004/0217877 A1 | 11/2004 | Kokonaski et al. | |
| 2006/0096392 A1 | 5/2006 | Inkster et al. | |
| 2006/0126177 A1 | 6/2006 | Kim et al. | |
| 2006/0197752 A1 | 9/2006 | Hurst et al. | |
| 2006/0284791 A1 | 12/2006 | Chen et al. | |
| 2007/0085828 A1 | 4/2007 | Schroeder et al. | |
| 2007/0085838 A1 | 4/2007 | Ricks et al. | |
| 2007/0139391 A1 | 6/2007 | Bischoff | |
| 2007/0247422 A1 | 10/2007 | Vertegaal et al. | |
| 2008/0005703 A1 | 1/2008 | Radivojevic et al. | |
| 2008/0062069 A1 | 3/2008 | Sinclair et al. | |
| 2008/0101456 A1 | 5/2008 | Ridge et al. | |
| 2008/0242418 A1 | 10/2008 | Theimer et al. | |
| 2008/0317292 A1 | 12/2008 | Baker et al. | |
| 2009/0003662 A1 | 1/2009 | Joseph et al. | |
| 2009/0043205 A1 | 2/2009 | Pelissier et al. | |
| 2009/0051662 A1 | 2/2009 | Klein et al. | |
| 2009/0061901 A1 * | 3/2009 | Arrasvuori et al. | 455/456.3 |
| 2009/0079941 A1 | 3/2009 | Miller et al. | |
| 2009/0144173 A1 | 6/2009 | Mo et al. | |
| 2009/0160785 A1 | 6/2009 | Chen et al. | |
| 2009/0160813 A1 | 6/2009 | Takashima et al. | |
| 2009/0167704 A1 | 7/2009 | Terlizzi et al. | |
| 2009/0237328 A1 | 9/2009 | Gyorfi et al. | |
| 2009/0270078 A1 | 10/2009 | Nam et al. | |
| 2009/0315851 A1 | 12/2009 | Hotelling et al. | |
| 2010/0001973 A1 | 1/2010 | Hotelling et al. | |
| 2010/0013767 A1 | 1/2010 | Baudisch et al. | |
| 2010/0020039 A1 | 1/2010 | Ricks et al. | |
| 2010/0029335 A1 | 2/2010 | Vartanian | |
| 2010/0045705 A1 | 2/2010 | Vertegaal et al. | |
| 2010/0060548 A1 | 3/2010 | Choi et al. | |
| 2010/0060803 A1 | 3/2010 | Slack et al. | |
| 2010/0079653 A1 | 4/2010 | Pance | |
| 2010/0103075 A1 | 4/2010 | Kalaboukis et al. | |
| 2010/0130296 A1 | 5/2010 | Ackley et al. | |
| 2010/0131865 A1 | 5/2010 | Ackley et al. | |
| 2010/0162109 A1 | 6/2010 | Chatterjee et al. | |
| 2010/0171680 A1 | 7/2010 | Lapidot et al. | |
| 2010/0194782 A1 | 8/2010 | Gyorfi et al. | |
| 2010/0199232 A1 | 8/2010 | Mistry et al. | |
| 2010/0214105 A1 | 8/2010 | Manotas, Jr. | |
| 2010/0214226 A1 | 8/2010 | Brown et al. | |
| 2010/0217619 A1 | 8/2010 | Cox et al. | |
| 2010/0220053 A1 | 9/2010 | Ishii | |
| 2010/0220280 A1 | 9/2010 | Hyytiainen | |
| 2010/0225576 A1 | 9/2010 | Morad et al. | |
| 2010/0225734 A1 | 9/2010 | Weller et al. | |
| 2010/0238114 A1 | 9/2010 | Vartanian et al. | |
| 2010/0245585 A1 | 9/2010 | Fisher et al. | |
| 2010/0259633 A1 | 10/2010 | Kii | |
| 2010/0259666 A1 | 10/2010 | Mori | |
| 2010/0277439 A1 | 11/2010 | Charlier et al. | |
| 2010/0287485 A1 | 11/2010 | Bertolami et al. | |
| 2010/0292886 A1 | 11/2010 | Szczerba et al. | |
| 2010/0295812 A1 | 11/2010 | Burns et al. | |
| 2010/0295820 A1 | 11/2010 | Kikin-Gil | |
| 2010/0315491 A1 | 12/2010 | Carter et al. | |
| 2010/0321275 A1 | 12/2010 | Hinckley et al. | |
| 2010/0321355 A1 | 12/2010 | Gotoh et al. | |
| 2010/0321377 A1 | 12/2010 | Gay et al. | |
| 2010/0323762 A1 | 12/2010 | Sindhu | |
| 2011/0018850 A1 | 1/2011 | Uehata et al. | |
| 2011/0021180 A1 | 1/2011 | Ray | |
| 2011/0034176 A1 | 2/2011 | Lord et al. | |
| 2011/0037924 A1 | 2/2011 | Kido | |
| 2011/0199342 A1 | 8/2011 | Vartanian et al. | |
| 2011/0227820 A1 | 9/2011 | Haddick et al. | |
| 2011/0231757 A1 * | 9/2011 | Haddick et al. | 715/702 |
| 2011/0296506 A1 | 12/2011 | Caspi | |
| 2012/0122570 A1 * | 5/2012 | Baronoff | 463/31 |

FOREIGN PATENT DOCUMENTS

| | | |
|---|---|---|
| KR | 2008066792 A | 7/2008 |
| KR | 2011010666 A | 2/2011 |
| WO | 2007012899 A1 | 2/2007 |
| WO | 2010024486 A1 | 3/2010 |

OTHER PUBLICATIONS

Savov, Vlad, "Lenovo teases S800 phone with translucent color display, won't let anyone touch it", Nov. 29, 2010.

Prodisplay Technologies LCD Glass and LCD Film Brochure, Date Unknown (Before filing date).

"Augmented reality Glasses 'StarkHUD 2020' Awesome from Fujikawa", Apr. 23, 2010, http://www.youtube.com/watch?v=1_u34kV9go0.

"7 things you should know about Augmented Reality", Sep. 2005, Educause Learning Initiative.

"Onyx Advantages Short Brochure", Jul. 1, 2008, Citala.

"Ambient light powered LCD released by Samsung", Mar. 4, 2011, PhysOrg.com.

"Mobile augmented reality Reality, improved", Sep. 3, 2009, The Economist.

Dannen, Chris, "Nokia's Sad Augmented Reality", Sep. 9, 2009, Fast Company.

Terraso, David, "Argon, the Augmented Reality Web Browser, Available Now on iPhone", Feb. 22, 2011, Atlanta, GA.

"Augmented Reality in the Real World", 2010, Technology Review, eFlorida.

"Augmented Reality—Is This a Good Idea", Feb. 27, 2009.

"Metaio Knows What's in Store for the future of Augmented Reality and the Sky's the Limit!", Dec. 30, 2010.

"Augmented Reality—the Drawn Way", Various Dates in 2011, Augmented Reality Blog.

Borgobello, Bridget, "Dynamic Eye sunglasses use moving LCD spot to reduce glare", Nov. 28, 2010, Gizmag.

Melanson, Donald, "Eyez video recording glasses promise to 'revolutionize' social networking", Mar. 8, 2011, Engadget.

Kleiner, Keith, "Augmented Human Reality Unveiled by MIT Researchers", Feb. 19, 2009, Singularity Hub.

June, Laura, "German researchers prototype 6mm thick pico projector", Jan. 29, 2011, Engadget.

Warren, Christina, "Augmented Reality Lets You Become 'Iron Man'", Apr. 23, 2010, Mashable.

"Iron Man 2 Augmented Reality App Coming to LG Phones", Jun. 23, 2010, Newsarama.com.

"Microsoft unveils pseudo-translucent display", Mar. 8, 2008, DeviceGuru.

"Nokia Research Center (NRC) brings latest innovations to Nokia World, Stuttgart, Sep. 2-3, 2009".

Berlin, Leslie, "Kicking Reality Up a Notch", Jul. 12, 2009, The New York Times.

"The Screens of the Future (transparent OLED)", Oct. 28, 2007, Digg.

"Ubiq'window | The Future is Transparent", Date Unknown (Before filing date), LM3LABS.

"Vuzix Wrap 920AR", Date Unknown (Before filing date), Vuzix.

Pachal, Peter, "World's First Eye-Controlled Laptop Arrives", Mar. 1, 2011, PCMag Mobile.

Hoshi et al., "Adding Tactile Reaction to Hologram", The 18th IEEE International Symposium on Robot and Human Interactive Communication, Sep. 27-Oct. 2, 2009, pp. 7-11, Toyama, Japan.

Shinoda et al., "Touchable Holography" http://www.youtube.com/watch?v=Y-P1zZAcPuw, Siggraph2009, Posted Jul. 16, 2009, University of Tokyo.

* cited by examiner

PROVIDING AUGMENTED REALITY BASED ON THIRD PARTY INFORMATION

FIELD OF INVENTION

This application is related to an apparatus and method for providing enhanced augmented reality and an advanced display device. An augmented or mixed reality world may be provided to a user based on other user or third party information, such as from a profile. A display device is provided with adaptive transparent and non-transparent portions for augmented reality and any other application.

BACKGROUND

Augmented or mixed reality is a way of superimposing or overlaying computer generated information onto a physical or real-world environment. The computer generated information may be visual, auditory, or tactile. Thus far, the computer generated information has been based on first person requests or configurations.

Display devices are commonplace in electronic devices such as mobile devices, cellular phones, personal digital assistants, smartphones, tablet personal computers (PCs), laptop computers, televisions, monitors, touchscreens, digital picture frame, or the like. Currently, display devices may be based on liquid crystal, plasma, light emitting, organic light emitting, or field effect technologies using ridged or flexible substrates. The next generation display devices may be transparent or clear opening new possibilities and applications, such as for augmented reality. However because of the transparency, viewing information in daylight or other environments is less optimal than opaque or darken background display devices.

Therefore, it is desirable to have augmented reality based on another's point of view and a transparent display device with controllable transparency.

SUMMARY

An apparatus and method for providing augmented or mixed reality environments based on other user or third party information, such as from a profile, is disclosed. Also, an apparatus and method for providing a transparent display device with adaptive transparency is disclosed. The transparent display device with adaptive transparency may be used to generate the augmented reality environment.

BRIEF DESCRIPTION OF THE DRAWINGS

A more detailed understanding may be had from the following description, given by way of example in conjunction with the accompanying drawings wherein.

DETAILED DESCRIPTION

Figure 1:
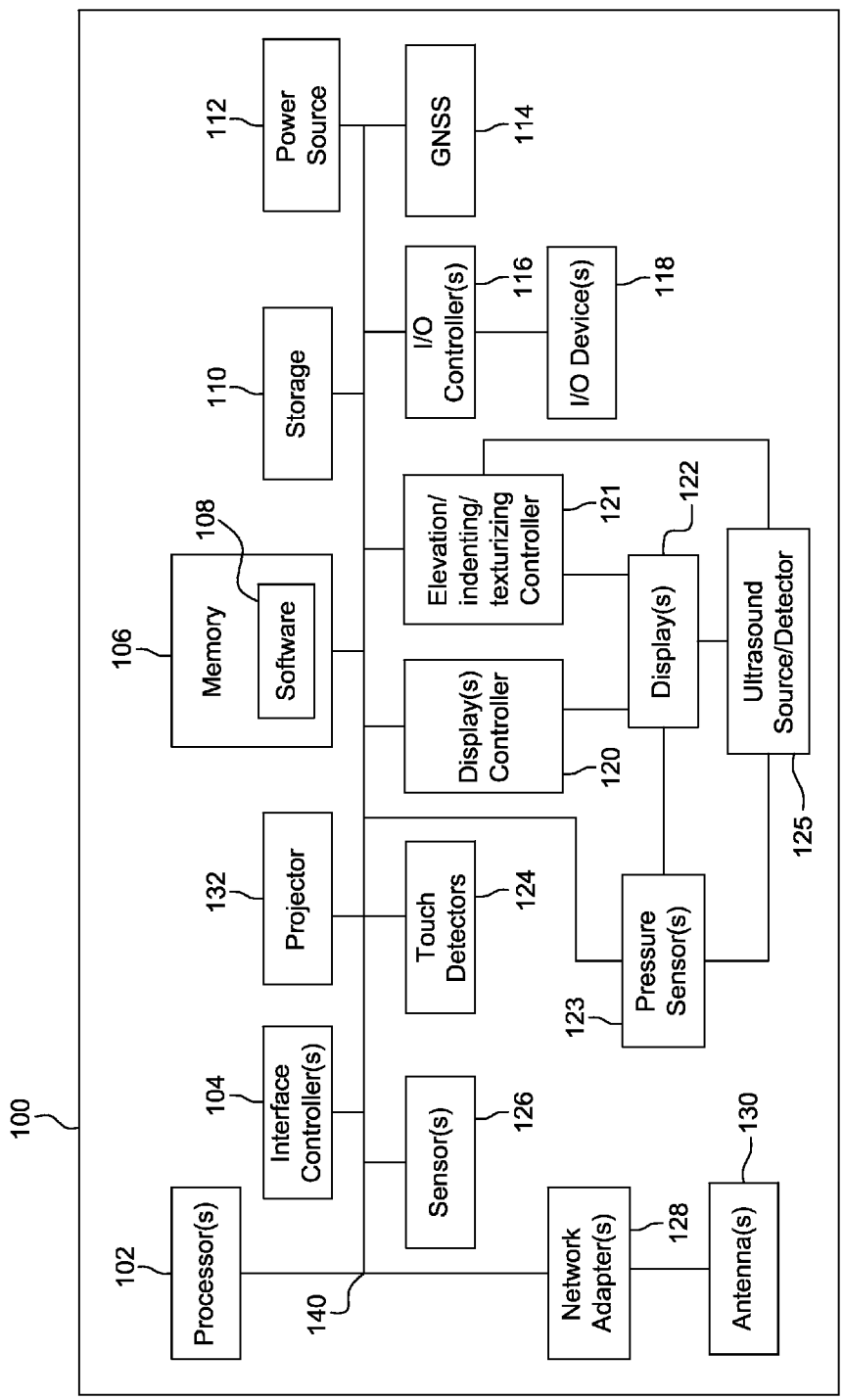
FIG. 1 is a diagram of an electronic device.

The present invention will be described with reference to the drawing figures wherein like numerals represent like elements throughout. For the methods and processes described below the steps recited may be performed out of sequence in any order and sub-steps not explicitly described or shown may be performed. In addition, "coupled" or "operatively coupled" may mean that objects are linked between zero or more intermediate objects. Also, any combination of the disclosed features/elements may be used in one or more embodiments. When using referring to "A or B", it may include A, B, or A and B, which may be extended similarly to longer lists.

U.S. Patent Publication No. 2010-238114 and U.S. patent application Ser. No. 12/706,205 are herein incorporated by reference as if fully set forth and may be used in combination with the given examples to provide a display device with portions that are selectively elevated, indented, or texturized. Also in the examples forthcoming, display devices may adaptively emit ultrasound, ultrasonic, acoustic, or radio waves to provide elevated, indented, or texturized sensation to an object near a display device.

Elevation or elevated sensations describe different sensations that may be caused to an object or person with a controlled flexible display device layer or using ultrasound at a predetermined or random distance from a display or electronic device. As an example, the relative distance of the object may be one or more millimeters to several meters, as desired. Indenting may be a configuration where an object or person is given a sensation around its perimeter while giving little sensation to the inner area of the object or person. Texturizing or texturing describes a process where an electronic device using a controlled flexible display device layer or ultrasound over air to provide, simulate, or mimic friction, pulsing sensation, pulsating sensation, variable smoothness, variable thickness, coarseness, fineness, irregularity, a movement sensation, bumpiness, or rigidity that is sensed by or detectable by an object or person.

FIG. 1 is a diagram of an object device 100 that may be a wireless subscriber unit, user equipment (UE), mobile station, smartphone, pager, mobile computer, cellular telephone, telephone, personal digital assistant (PDA), computing device, surface computer, tablet computer, monitor, general display, versatile device, digital picture frame, appliance, automobile computer system, vehicle computer system, part of a windshield computer system, television device, home appliance, home computer system, laptop, netbook, tablet computer, personal computer (PC), wireless sensor, an Internet pad, digital music player, peripheral, add-on, an attachment, virtual reality glasses, media player, video game device, head-mounted display (HMD), helmet mounted display (HMD), glasses, goggles, or any electronic device for mobile or fixed applications.

Object device 100 comprises computer bus 140 that couples one or more processors 102, one or more interface controllers 104, memory 106 having software 108, storage device 110, power source 112, and/or one or more displays controller 120. In addition, object device 100 comprises an elevation, indenting, or texturizing controller 121 to provide sensations to an object or person located near one or more display devices 122.

One or more display devices 122 can be configured as a plasma, liquid crystal display (LCD), light emitting diode (LED), field emission display (FED), surface-conduction electron-emitter display (SED), organic light emitting diode (OLED), or flexible OLED display device. The one or more display devices 122 may be configured, manufactured, produced, or assembled based on the descriptions provided in U.S. Patent Publication Nos. 2007-247422, 2007-139391, 2007-085838, or 2006-096392 or U.S. Pat. No. 7,050,835 or WO Publication No. 2007-012899 all herein incorporated by reference as if fully set forth. In the case of a flexible or bendable display device, the one or more electronic display devices 122 may be configured and assembled using organic light emitting diodes (OLED), liquid crystal displays using flexible substrate technology, flexible transistors, field emission displays (FED) using flexible substrate technology, or the like.

One or more display devices 122 can be configured as a touch or multi-touch screen display using resistive, capacitive, surface-acoustic wave (SAW) capacitive, infrared, strain gauge, optical imaging, dispersive signal technology, acoustic pulse recognition, frustrated total internal reflection, or magneto-strictive technology, as understood by one of ordinary skill in the art. One or more display devices 122 can also be configured as a three dimensional (3D), electronic paper (e-paper), or electronic ink (e-ink) display device.

Coupled to one or more display devices 122 may be pressure sensors 123. Coupled to computer bus 140 are one or more input/output (I/O) controller 116, I/O devices 118, global navigation satellite system (GNSS) device 114, one or more network adapters 128, and/or one or more antennas 130. Examples of I/O devices include a speaker, microphone, keyboard, keypad, touchpad, display, touchscreen, wireless gesture device, a digital camera, a digital video recorder, a vibration device, universal serial bus (USB) connection, a USB device, or the like. An example of GNSS is the Global Positioning System (GPS).

Object device 100 may have one or more motion, proximity, light, optical, chemical, environmental, moisture, acoustic, heat, temperature, radio frequency identification (RFID), biometric, face recognition, image, photo, or voice recognition sensors 126 and touch detectors 124 for detecting any touch inputs, including multi-touch inputs, for one or more display devices 122. Sensors 126 may also be an accelerometer, an electronic compass (e-compass), gyroscope, a 3D gyroscope, or the like. One or more interface controllers 104 may communicate with touch detectors 124 and I/O controller 116 for determining user inputs to object device 100. Coupled to one or more display devices 122 may be pressure sensors 123 for detecting presses on one or more display devices 122.

Ultrasound source/detector 125 may be configured in combination with touch detectors 124, elevation, indenting, or texturizing controller 121, one or more display devices 122, pressure sensors 123, or sensors 126 to project or generate ultrasound waves, rays, or beams to an object to simulate elevated, indented, or texturized sensations, recognize inputs, or track the object. There may be cases for input recognition or object tracking wherein an ultrasound is provided without detected sensation to the object.

Still referring to object device 100, storage device 110 may be any disk based or solid state memory device for storing data. Power source 112 may be a plug-in, battery, solar panels for receiving and storing solar energy, or a device for receiving and storing wireless power as described in U.S. Pat. No. 7,027,311 herein incorporated by reference as if fully set forth.

One or more network adapters 128 may be configured as a Frequency Division Multiple Access (FDMA), single carrier FDMA (SC-FDMA), Time Division Multiple Access (TDMA), Code Division Multiple Access (CDMA), Orthogonal Frequency-Division Multiplexing (OFDM), Orthogonal Frequency-Division Multiple Access (OFDMA), Global System for Mobile (GSM) communications, Interim Standard 95 (IS-95), IS-856, Enhanced Data rates for GSM Evolution (EDGE), General Packet Radio Service (GPRS), Universal Mobile Telecommunications System (UMTS), cdma2000, wideband CDMA (W-CDMA), High-Speed Downlink Packet Access (HSDPA), High-Speed Uplink Packet Access (HSUPA), High-Speed Packet Access (HSPA), Evolved HSPA (HSPA+), Long Term Evolution (LTE), LTE Advanced (LTE-A), 802.11x, Wi-Fi, Zigbee, Ultra-Wide-Band (UWB), 802.16x, 802.15, Wi-Max, mobile Wi-Max, Bluetooth, radio frequency identification (RFID), Infrared Data Association (IrDA), near-field communications (NFC), or any other wireless or wired transceiver for modulating and demodulating signals via one or more antennas 130. One or more network adapters 128 may also be configured for automobile to automobile, car to car, vehicle to vehicle (V2V), or wireless access for vehicular environments (WAVE) communication. One or more network adapters 128 may also be configured for human body communications where the human body is used to communicate data between at least two computers coupled to the human body.

Any of devices, controllers, displays, components, etc. in object device 100 may be combined, made integral, or separated as desired. For instance, elevation, indenting, or texturizing controller 121 may be combined with ultrasound source/detector 125 in one unit.

Figure 2A:
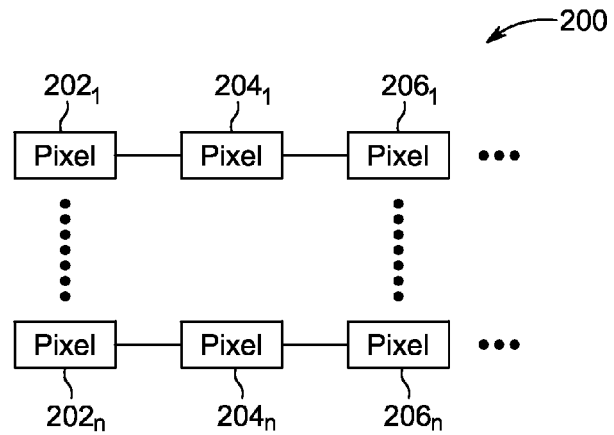
FIGS. 2a-2c are diagrams of configurations for providing a display device with adaptive transparency.
Figure 2B:
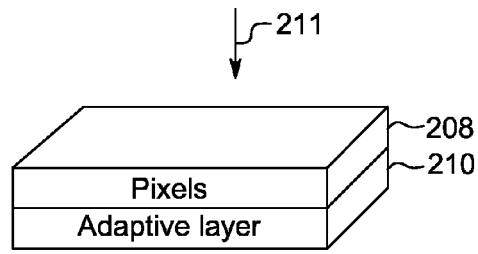
Figure 2C:
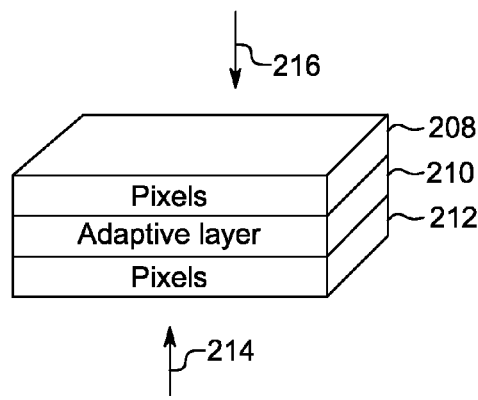

FIGS. 2a-2c are diagrams of configurations for providing a display device with adaptive transparency. In FIG. 2a, display device 200 comprises of an array of pixels $202_1$-$202_n$, $204_1$-$204_n$, and $206_1$-$206_n$. Display device 200 can be either a flexible, bendable, or rigid display device for displaying video, images, photos, graphics, text, etc. Display device 200 may be configured for reflective, transmissive, transflective, passive matrix, or active matrix operation. Display device 200 may be configured with at least some of the components and parts shown in object device 100.

FIG. 2b shows a different view of display device 200 having pixels layer 208 and adaptive layer 210. Although two layers are shown in FIG. 2b, display device 200 in FIG. 2b may be composed of a plurality of other layers having components or devices not shown. For instance, a mirror like layer may be included below adaptive layer 210. In addition, layers 208 and 210 may be composed of sublayers having components or devices not shown. In FIG. 2b, the viewing may be from direction 211 and may be up to 180 degrees.

FIG. 2c is a diagram for providing a double-sided viewing display device with adaptive transparency. In FIG. 2c, adaptive layer 210 is situated in between pixels layers 208 and 212. Although three layers are shown in FIG. 2c, display device 200 in FIG. 2c may be composed of a plurality of other layers having components or devices not shown. In addition, layers 208, 210, and 212 may be composed of sublayers having components or devices not shown. In FIG. 2c, the viewing may be from directions 214 or 216 and may be up to 180 degrees. Double-sided viewing may be used to display different information on each side of adaptive layer 210. For instance, pixels layer 208 may show a video in a programmed zone or area while pixels layer 212 displays an image over the same or different zone or area.

Adaptive layer 210 may comprise of electronically or electromechanically controlled polarization filter devices. Adaptive layer 210 may also be any other devices for electronically or electromechanically controlling the emission, transmission, reflection, refraction, or scattering of electromagnetic waves, such as light, through a layer thereby being able to adaptively control transparency of a display. Examples of electronically or electromechanically controlled polarization are described in U.S. Pat. Nos. 7,751,122 and 7,724,441 and U.S. Patent Publication Nos. 2010-171680 all herein incorporated by reference as if fully set forth. Alternatively, adaptive layer 210 may be comprised of a substrate material that can be electronically controlled. An example of such a material may be nanotechnology enabled nanoparticles.

Adaptive layer 210 may be divided into selectively controllable predetermined/adaptive zones or areas of different sizes. A zone or area may be comprised of tens, hundreds, thousands, millions, or any number of scanned horizontal or vertical lines of pixels. The zones or areas may be used for determining when a certain portion of display device 200 is operating in a clear, semi-clear, see-through, partially see-through, transparent, semi-transparent, translucent, or semi-translucent operating state or mode. These states or modes allow a user to see at least partially the environment behind display device 200.

The zones or areas may be used for determining when a certain portion of display device 200 is operating in a non-translucent, nontransparent, darkened, dark, opaque, or semi-opaque operating state or mode. These states or modes inhibit or prevent a user to see at least partially the environment behind display device 200. Any of the states or modes listed above may be combined in varying degrees in the given examples or descriptions. Switching between different states or mode for an area or zone may be done based on configuration or control information provided to one or more displays controller 120 for properly displaying the areas or zones by adaptively controlling adaptive layer 210.

Having a transparent display device with adaptive transparency provides the ability to selectively see any combination of reality, mixed reality, and normally displayed information with a darkened background. The switching between different operating states or modes may be needed depending on the information being displayed. For augmented or mixed reality a clear, semi-clear, or equivalent state is useful for overlaying, superimposing, covering up, or encompassing data over a real world environment. However, for watching video a darkened or opaque background may be desirable to provide better contrast especially in environments with a high level of ambient light.

Moreover, the switching of different operating states or modes may be done automatically based on feedback from sensors 126 or manually. For instance, sensors 126 may detect the amount of light in an environment and adjust the transparency for a certain zone or area for optimal viewing. Under direct sunlight, display device 200 can be configured to adaptively block sun rays directed towards a user's eyes by making a zone or area opaque or semi-opaque. The switching of different states or modes may also be done automatically based on the information requested to be displayed or context awareness feedback detected by object device 100.

When display device 200 is configured with a mirror like layer or backplane, the device may function as a mirror when adaptive layer 210 is clear or semi-clear. Display device 200 may also be configured to function as an adaptive, interactive, smart, or augmented reality mirror by displaying first or third person profile information on pixels layer 208 when adaptive layer 210 is clear or semi-clear in any zone or area. Display device 200 may also be configured to operate as a mirror and smart display device by displaying video, news, or any information in any zone or area of pixels layer 208 with adaptive layer 210 operating in an opaque or semi-opaque mode.

Figure 3:
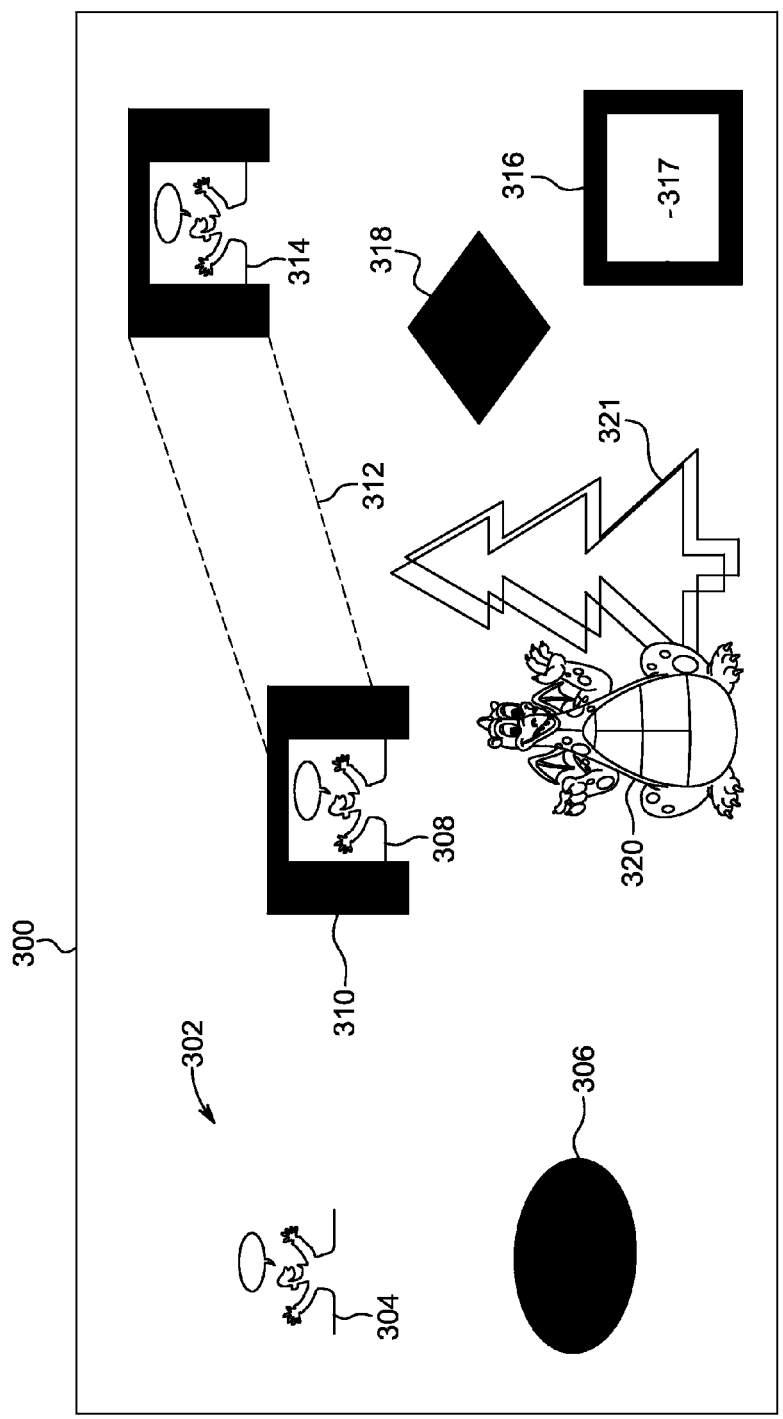
FIG. 3 is a diagram of a displayed augmented reality environment.

FIG. 3 is a diagram of a displayed augmented reality environment. Display device 300 includes a clear display area 302. Although one side is shown, display device 300 may be configured for double-sided viewing as shown in FIG. 2c. Display device 300 may be configured with at least some of the components and parts shown in object device 100.

Image or video 304 is displayed with a clear or semi-clear background. Substantially circular area or zone 306 may be controlled to provide an opaque or semi-opaque region. Although the example has an image or video, text or any other form of information may be displayed on display device 300. Display device 300 may also have circuitry configured to provide area or zone 316 where a border is opaque or semi-opaque while space or area 317 is clear or semi-clear. The configuration for area or zone 316 may be used for a picture frame, theater stage, classroom, interactive blackboard, presentations, trade show etc. where a user or object may be in front or behind area 317 with information adaptively being displayed in area or zone 316 and/or area 317.

In addition, substantially diamond like area or zone 318 may be controlled to provide an opaque or semi-opaque region. Besides the shapes shown on display device 300, any controllably transparent shape may be provided such as a square, quadrangle, polygon, triangle, quadrilateral, pentagon, hexagon, octagon, star, oval, sphere, etc.

Still referring to FIG. 3, image or video 308 is provided with an opaque or semi-opaque substantially rectangular area or zone 310. Area or zone 310 may be moved via path 312 to position 314 in response to a touch input, multitouch inputs, any command, zoom command, eye tracking feedback, blinking, facial gestures, hand gestures, voice command, speech command, brainwaves, motion, movement, location change, position change, or context awareness detected by pressure sensors 123, touch detectors 124, sensors 126, and/or GNSS device 114. Area or zone 310 may also be moved via path 312 responsive to an anticipated gaze of a user.

Area or zone 310 may also be adaptively duplicated, removed, resized, or converted to clear or semi-clear based on commands or inputs given in the other examples. Moreover, area or zone 310 and/or image or video 308 may be expanded, shrunk, zoomed in, or zoomed out via any user input previously mentioned. As the size of area or zone 310 is adjusted, pixels are adaptively darkened or lightened in response to the size change of area or zone 310.

Elevation, indenting, or texturizing controller 121 may be used to provide areas or zones with adaptive transparency at different levels relative to the top plane of display device 300 providing real texturing. The different levels may be used to represent on-screen buttons, special text, an advertisement, a game related object, etc. Similarly, ultrasound source/detector 125 may be used for providing augmented or mixed reality in combination with the adaptive transparency in display device 300 by projecting airborne ultrasound signals to an object or part of a person, such as a finger or hand, related to displayed information.

Alternatively, clear display area 302 may be inverted or reversed to be mostly semi-opaque or opaque having displayed information and a selected window is clear. One benefit for this configuration is being able to see a person through a clear window in a meeting or office while being able to read content on a screen or display at the same time.

Image or video 320 is overlaid, superimposed, or encompassed on an object or person seen through clear display area 302 for creating and presenting augmented or mixed reality based on other user or third party information. The augmented object or person may also include an augmented background object or scenery 321. Alternatively, rather than being viewed through clear display area 302, image or video 320 may be generated by a camera capturing the real world environment and displaying it with overlaid, superimposed, or encompassed information. The camera may be a separate unit or an integrated device into the display area or pixels as described in U.S. Patent Publication Nos. 2010-321355 and 2011-018850 both herein incorporated by reference as if fully set forth. In addition to image or video, the overlaid information may be text, email, instant messages, audio, music, sounds, etc.

The other user or third party information may be received wirelessly using one or more network adapters 128 in a message from a server, directly from another user device, or a "cloud" based system (not shown). The other user or third party information may also be received by beacons transmitting data close to display device 300. The other user or third party information may be stored and accessed on storage device 110.

The other user information may be based on a profile, a user profile, social networking profiles, dating profiles, any user setting, a game setting, a mood profile, a magazine style, a custom look, mimicking a character, emulating a character, a Second Life setting, virtual Facebook, augmented Facebook, etc. of another user to provide the view of the world onto a first or primary user of object device 100. By tailoring another's environment and controlling their environment new insights are gained and learned from others. The other user may be a friend, relative, stranger, coworker, etc. of the first or primary user.

Moreover, profile settings may exist to adapt to different moods, relationship statuses, events, environments, etc. set by another user or entity. For instance, the another user may be seen by others as a dragon if they are angry, a geek to look smart, or a buff guy to arouse women if they are single. Moreover, the profile may be configured to change the augmentation of a person, environment, or object based on time, days of the week, seasons, holidays, etc.

With context awareness, a profile can adapt based on a detected event or environment. Another user's profile or information may say every tree that is detected by the object device 100 and/or display device 300 is automatically augmented to appear as a palm tree. This action is similar to an automatic find and replace feature. The other profile or information may also control how you see other people. For instance, certain people another person does not like turns into a monkey or devil. The profile may also have settings to augment a background or scenery in addition to an object or person itself to be displayed on display device 300, such as with background object or scenery 321.

The other user information or profile may be received and generated in the augmented or mixed reality world when the other user or an object is detected within the environment of the first or primary user of object device 100 using well-known techniques for text recognition, character recognition, image recognition, video recognition, speech recognition, or voice recognition processed by one or more processors 102 or remotely on a server (not shown). The other user may also be detected in the augment reality world using location based services (LBS) with GNSS device 114. Moreover, the other user may be detected based on a smart or RFID tag detected by sensors 126.

As another example, the other user information may set that today the user will be seen by others as a certain movie star with selectable makeup, clothes, or hairstyle. Another user may set a likeness, face, or character to be played. As another example, another user may set how a certain food or car will look to others.

As another example, other user information may be purchased in a virtual marketplace or obtained for free by selling advertisements on the augmented person or object. Alternatively for e-business, another user may create a custom augmented reality design and offer it to sell to the first or primary user. Moreover, a user may be paid by a sponsor to look a certain way to other users or devices with a sponsorship profile. A municipality or owner of real estate may sell space or objects seen in public to a sponsor to be augmented to selectively be seen a certain way by other users or devices.

Although the examples given thus far are from a second person point of view, the present embodiments may also create first, third, or alternating party augmented reality worlds. In particular with third party information, a user may be able to see an augmented reality version of a show or program. Third party information may also include a gaming augmented reality environment provided by a service provider. Moreover, any of the example information provided above for other users may be provided by a third party or service provider. Thus, the present examples can be used with any narrative mode.

In the case of first party augmented reality profile, the profile may set as an example how a person's house or car looks to them. For instance, a house may be augmented to appear as a castle and an old car may be augmented to appear as a sports car. This may be extended to any other possession or object. The first person profile may then be shared so that others can see their possessions in the same way when present in the same environment and detected by object device 100.

For the case of augmented audio, music, or sounds, augmented reality can be used to play a song associated with another user or object when that user or object is detected by object device 100. The augmented audio, music, or sounds may be included in the other user information or any profile. For instance, image or video 320 may include a selected theme song to be played when the user or object is in the environment of the first or primary user. This example is similar to an augmented reality ringtone or videotone.

As another example, display device 300 can be configured to display an augmented theme, environment, drink, or food in a restaurant profile. For instance, a restaurant may be designed with plain walls or simple decorations to be augmented. Augmented reality devices similar to object device 100 may be handed to patrons when entering a restaurant. Alternatively, an augmented reality capable device downloads the restaurant profile from a server on the Internet or a beacon in the restaurant using one or more network adapters 128. A benefit to this may be that a restaurant has lower startup costs and can have adaptive decorations to generate new business. A similar configuration may be used for a decorated restaurant where the augmented reality enhances the dining experience.

As another example, the augmented reality other user information or profile may include motion, movement, or action based setting. For instance, another user may be able to be seen as lifting objects up when making the motion, movement, or action of bending down to lift a car. The motion, movement, or action can be anything detected by object device 100 and/or sensors 126.

Furthermore, for inputting data to object device 100 for adaptive transparency, augmented reality, or any other application, camera in I/O devices 118 may be used to detect or read lip, mouth, or tongue movement for speech recognition, voice recognition, or voice commands. Lip, mouth, or tongue movement may be detected when the user is speaking with sound or silently speaking without sound. Speaking without sound, speaking with little sound, pretend speaking, or whispering is advantageous since it does not disturb others around the user. Images captured by camera in I/O devices 118 may be processed by well-known techniques by image or video recognition engines in software 108 to determine user input. Object device 100 may use lip or tongue movement primarily for inputting text, to assist with an existing speech or voice recognition system to interpret spoken language, or to determine voice commands.

In addition, data may be inputted or action taken depending on how object device 100 is held based on finger placement to provide a context aware operating system. For instance when object device 100 is configured as augmented reality glasses, holding the glasses like a camera will put object device 100 into camera mode to take a picture. Object device 100 may detect finger placement by having a touch sensitive case or shell. As another example, when object device 100 determines it is outside and moving, the operating system will automatically switch to navigation mode.

As mentioned above, display device 300 may be part of augmented reality glasses, goggles, or a head mounted display having at least some of the components in object device 100. Glasses or goggles are advantageous since it allows hands free operation. In addition, picoprojector 132 may be used to project information based on other user information on to any surface. Sensors 126 may be configured to update the augmented reality environment or adaptive transparency of display device 300 based on motion or rotation. The present examples are also applicable for virtual reality worlds. Moreover, a haptic or sensory feedback glove or bracelet may be provided to augment the feeling of an environment.

Figure 4:
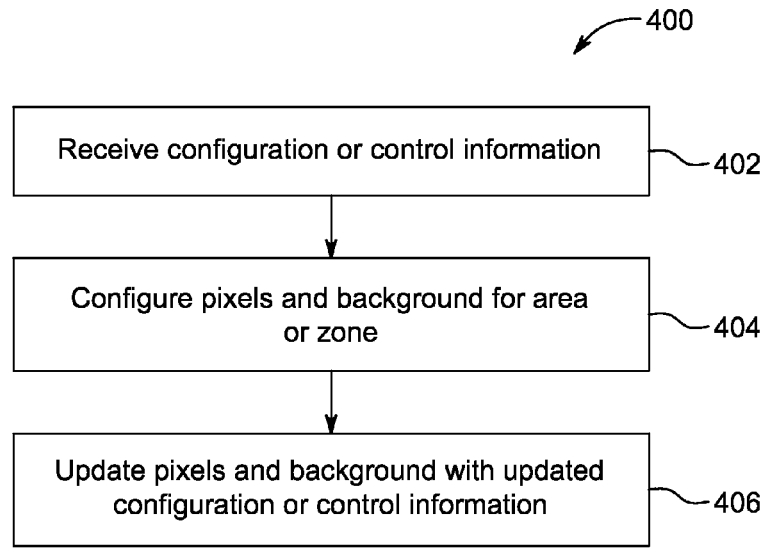
FIG. 4 is a process for providing a display device with adaptive transparency.

FIG. 4 is a process 400 for providing a display device with adaptive transparency. Configuration or control information (402) is received setting what areas or zones on a display device will selectively be transparent, opaque, or any level in between. The configuration or control information may be received remotely or locally on object device 100. As an example, the configuration or control information may be received from a server remotely via one or more network adapters 128 or from software residing on object device 100. The configuration or control information may be used by one or more displays controller 120 for properly displaying the areas or zones by adaptively controlling adaptive layer 210. The pixels and background for the area or zone are configured depending on the configuration or control information (404). The pixels and background may then be updated with new configuration or control information (406) to combine, move, resize, refresh, or alter areas or zones.

Figure 5:
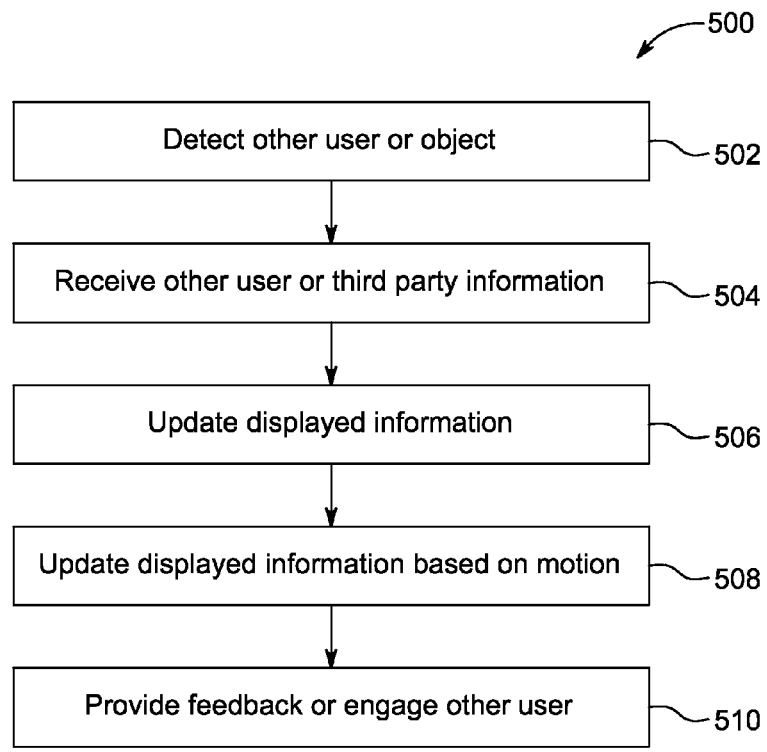
FIG. 5 is a process for providing an augmented reality environment.

FIG. 5 is a process 500 for providing an augmented reality environment. The other user or object is detected in an environment (502), for example by image recognition. Other user or third party information, such as a profile, is received (504). The other user or third party information is used to update the displayed information on a display device (506), that may be adaptively transparent, to augment an object or person. The displayed augmented reality world may then be updated based on motion, such as provided by the other user or third party information (508). Optionally, feedback is provided for the augmented look to the other user and/or the other user is engaged (510).

Although features and elements are described above in particular combinations, each feature or element may be used alone without the other features and elements or in various combinations with or without other features and elements. The methods, processes, or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, digital versatile disks (DVDs), and BluRay discs.

Suitable processors include, by way of example, a general purpose processor, a multicore processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement hardware functions for use in a computer, wireless transmit receive unit (WTRU), or any host computer. The programmed hardware functions may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

Any of the displays, processors, memories, devices or any other component disclosed may be configured, produced, or engineered using nanotechnology based nanoparticles or nanodevices.

What is claimed is:

1. A mobile electronic device, arranged as one of glasses or goggles, the mobile electronic device comprising:
   a processor to receive, via a network adapter from another mobile device, a profile, wherein the profile is set by a first user on a social network application to determine a view of a second user;
   a camera to capture an image, wherein the first user in the image is detected and augmented by overlaying other images on the first user of a virtual character specified in the profile; and
   a transparent display layer to display the first user in the image augmented, wherein the mobile electronic device is associated with the second user and the image augmented is projected by a projector device.

2. The mobile electronic device of claim 1 further comprising the transparent display layer having adaptively transparent portions that are selectively controlled to one of a clear, partially opaque, or opaque state.

3. The mobile electronic device of claim 1 wherein the transparent display layer is a display device to display information with the image augmented.

4. A method performed by a mobile electronic device, arranged as one of glasses or goggles, the method comprising:
   receiving, by the mobile electronic device from another mobile device, a profile, wherein the profile is set by a first user on a social network application to determine a view of a second user;
   capturing, by a camera on the mobile electronic device, an image, wherein the first user in the image is detected and augmented by overlaying other images on the first user of a virtual character specified in the profile; and
   displaying, by a transparent display layer, the first user in the image augmented, wherein the mobile electronic device is associated with the second user and the image augmented is projected by a projector device.

5. The method of claim 4 further comprising:
selectively controlling, by the mobile electronic device, portions of the transparent display layer to one of a clear, partially opaque, or opaque state.

6. The method of claim 4 further comprising:
displaying, by the transparent display layer used as a display device, information with the image augmented.

\* \* \* \* \*